United States Patent
Wegener (10) Patent No.: US 6,567,660 B1
(45) Date of Patent: May 20, 2003

(54) ON-DEMAND INFORMATION SERVICE USING WIRELESS CELLULAR COMMUNICATIONS SYSTEM

(75) Inventor: Albert W. Wegener, Portola Valley, CA (US)

(73) Assignee: Command Audio Corporation, Redwood City, CA (US)

(*) Notice: Subject to any disclaimer, the term of this patent is extended or adjusted under 35 U.S.C. 154(b) by 0 days.

(21) Appl. No.: 09/630,039

(22) Filed: Aug. 1, 2000

(51) Int. Cl.[7] ................................................ H04M 3/00
(52) U.S. Cl. ..................... 455/418; 455/3.01; 455/3.06; 455/419
(58) Field of Search ................................. 455/466, 418, 455/77, 137, 3.01, 3.04, 3.06, 412, 419, 420

(56) References Cited

U.S. PATENT DOCUMENTS

| | | | |
|---|---|---|---|
| 5,585,850 A | * 12/1996 | Schwaller | 375/240.01 |
| 5,697,077 A | * 12/1997 | Saitoh | 455/186.1 |
| 6,029,064 A | * 2/2000 | Farris et al. | 455/412 |
| 6,201,974 B1 | * 3/2001 | Lietsalmi et al. | 455/466 |
| 6,256,509 B1 | * 7/2001 | Tanaka et al. | 455/515 |

FOREIGN PATENT DOCUMENTS

EP          0 944 275 A2     9/1999

OTHER PUBLICATIONS

Patent Abstracts of Japan; vol. 2000, No. 9, Oct. 13, 2000.

* cited by examiner

Primary Examiner—Edward F. Urban
Assistant Examiner—Erika A. Gary
(74) Attorney, Agent, or Firm—Morrison&Foerster LLP (57) ABSTRACT

The quantity of unused channels in a cellular wireless communications system is identified. From program content that is stored in a database, an amount of program content is accessed based on the identified quantity of unused channels. The accessed program content is formatted for broadcast on at least a portion of the unused channels, and the formatted content is then transferred to the cellular wireless communications system for broadcast to mobile receivers. In some embodiments a content transmission schedule is broadcast on one of the unused channels.

13 Claims, 6 Drawing Sheets

ON-DEMAND INFORMATION SERVICE USING WIRELESS CELLULAR COMMUNICATIONS SYSTEM

BACKGROUND

1. Field of Invention

The present invention is related to on-demand information systems that broadcast program content to mobile receivers for capture, storage, and subsequent playback of the stored content to a user.

2. Related Art

Figure 1:
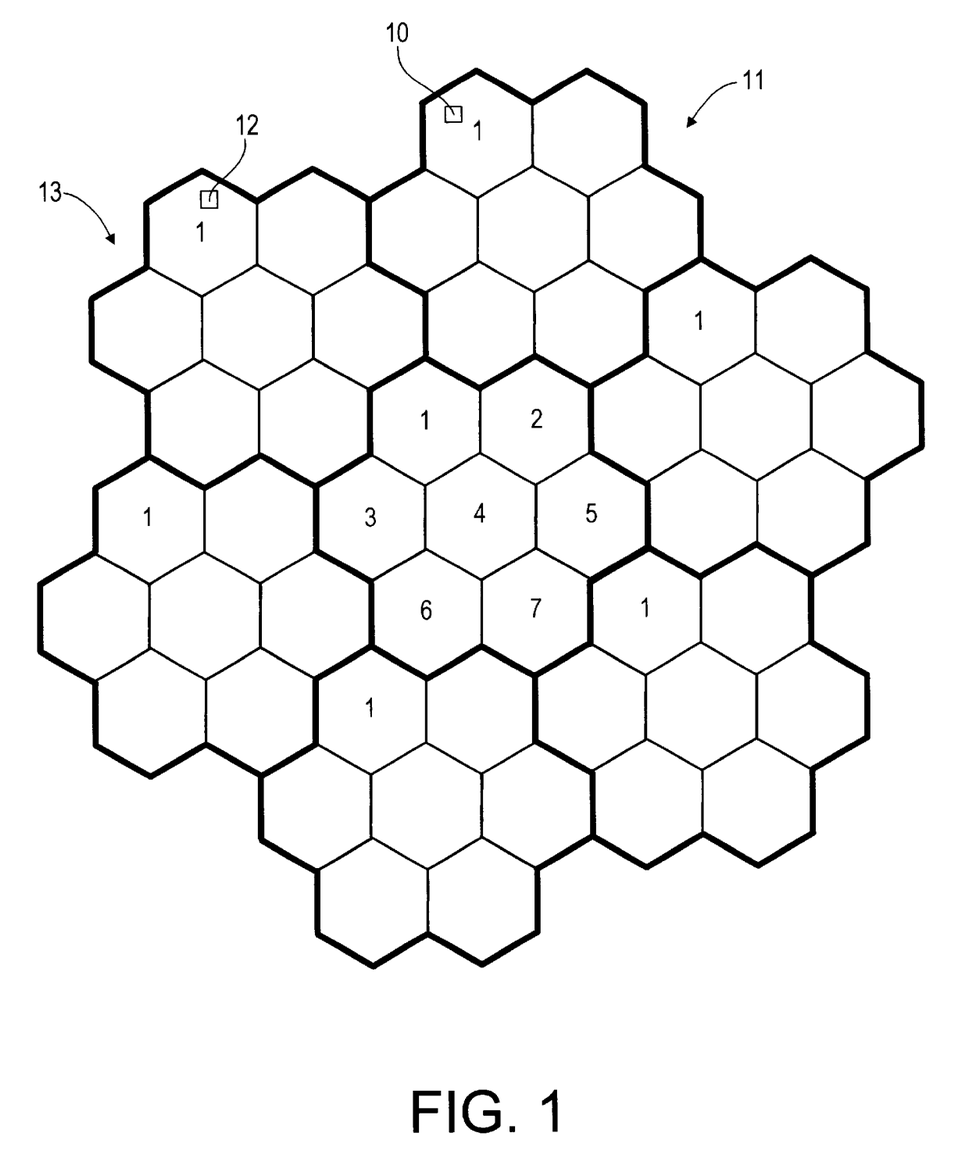
FIG. 1 illustrates a typical cellular tiling pattern.

Cellular wireless (e.g., radio) communication systems that provide telephone links between a public switched telephone network (PSTN) and mobile transceivers (e.g., cellular telephone handsets or "mobiles") are well-known. FIG. 1 illustrates a typical cellular tiling pattern of seven cells 1–7. A base station is typically positioned in each cell. Both the base stations and the mobiles operate using transmit power levels that are low enough so that interference does not occur in similarly numbered cells in adjacent patterns. For example, base station 10 that operates in cell 1 of tiling pattern 11 does not interfere with base station 12 that operates in cell 1 of an adjacent tiling pattern 13. Thus frequencies can be reused over a wide geographic area.

In the United States, cellular wireless communications systems are assigned specific operating frequency spectra. In the United States analog cellular system, for example, uplink communication (mobile to base station) occurs in 30 kilohertz (kHz) channels in the frequency spectrum from 824 megahertz (MHz) to 849 MHz. Downlink communication (base station to mobile) occurs in other 30 kHz channels in the frequency spectrum from 869 MHz to 894 MHz. In this frequency channel assignment scheme, 45 MHz separates the uplink and downlink channels, and therefore 833 pairs of uplink-downlink channel pairs are created. In the United States, the uplink-downlink pairs are allocated among two commercial service providers for public policy reasons. The 25 MHz uplink and downlink spectra are therefore divided in half, with each service provider using 416 uplink-downlink channel pairs. The channel pairs are further divided among the cells in each tile pattern.

The U.S. digital cellular system is backwards compatible with the analog frequency spectrum and supports three simultaneous radio links within the bandwidth used for one analog radio link. Spread spectrum cellular systems (e.g., code division multiple access (CDMA)) also reuse coded channels in a similar way. Thus the term "channel" as used in this description includes an analog voice channel in an analog cellular system, a time slot of a digital voice channel in a time division multiple access (TDMA) digital cellular system, and a coded channel in a code division multiple access (CDMA) digital cellular system.

Channels in each cell are designated as setup, paging, or voice traffic channels. For instance, in a geographic coverage area, each commercial cellular service provider is allocated 21 setup (uplink) and 21 paging (downlink) channels (3 per cell in a k=7 tiling pattern), and therefore 395 voice traffic channels remain for each service provider to use (approximately 56 unique voice channel uplink-downlink pairs per cell in the k=7 pattern). The number of voice channels in use varies during the day. For example, during peak voice traffic time (e.g., 5:00 p.m. (1700)), most of the voice channels in individual cells are in use. During non-peak times (e.g., 3:00 a.m. (0300)), however, most of the voice channels are unused. Thus a large portion of the cellular spectrum is unused during the day.

Audio/video-on-demand systems broadcast content (e.g., information and entertainment programs such as news, music, financial information, traffic reports) to users (system subscribers). The broadcast content is selectively received (captured) by and stored in mobile receivers (local storage) for subsequent output (playback) to the human user (see e.g., U.S. Pat. Nos. 5,406,626, 5,524,051, and 5,590,195, each incorporated herein by reference). Existing audio/video-on-demand systems broadcast content on portions of the radio frequency spectrum such as sidebands of commercial FM radio station frequencies. But, additional bandwidth is required as the amount of content that is offered to audio/video-on-demand subscribers increases.

SUMMARY

In accordance with the invention, unused channels in a cellular wireless communications system frequency spectrum are used for broadcast of content to mobile audio/video-on-demand receivers. The number of channels that are used to broadcast content to the receivers is varied as demand for voice traffic channel changes. The quantity of unused channels is identified, and an amount of program content that is stored in a database is accessed based on the quantity of unused channels. The accessed program content is formatted for broadcast on at least a portion of the unused channels. The formatted content is then transferred to the cellular wireless communications system for broadcast to the mobile receivers.

In some embodiments a content transmission schedule is broadcast on one of the unused channels. The transmission schedule includes the program content identifier for the programs being broadcast and the channel on which the program is broadcast. In some embodiments the transmission schedule includes the time at which particular programs will be broadcast.

DETAILED DESCRIPTION

Figure 2:
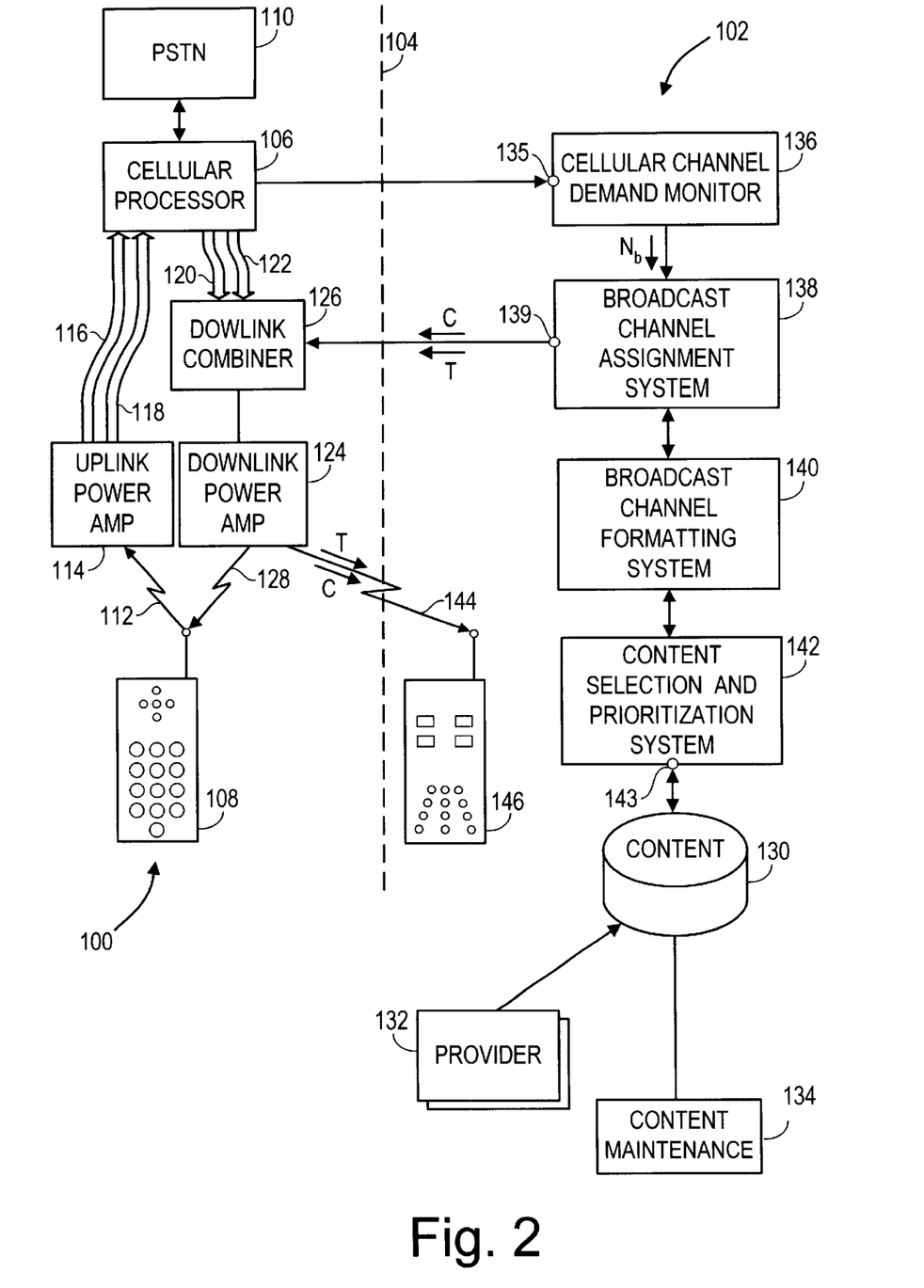
FIG. 2 is a diagrammatic view illustrating an embodiment of the invention.

FIG. 2 is a diagrammatic view illustrating functional blocks in an embodiment of an audio/video-on-demand broadcast information system that includes a cellular wireless communications system. Elements 100 on the left side of the drawing are associated with the cellular wireless communications system. Elements 102 on the right side of the drawing are associated with the audio/video-on-demand system. Elements 100 and 102 are shown separated by dashed line 104 for illustrative purposes only.

Cellular processor 106 performs well-known cellular system functions (e.g., mobile unit registration, two-way call management, data compression and packetization) to control setup, paging, and voice traffic processing between portable transceiver 108 (e.g., cellular telephone handset) and PSTN 110. Transceiver 108 outputs uplink signal 112 to uplink power amplifier 114 which routes setup information 116 and uplink voice traffic 118 to cellular processor 106. Similarly, cellular processor 106 routes paging information 120 and downlink voice traffic 122 to base station downlink power amplifier 124. The downlink information 120, 122 is routed through the existing cellular system's downlink combiner 126, which is described in detail below. Downlink power amplifier 124 outputs downlink signal 128 to transceiver 108. Telephone calls between transceiver 108 and PSTN 110 are managed using well-known protocols.

The digitized audio and/or video program content (e.g., news, entertainment, bulletins) to be broadcast to the audio/video-on-demand receivers is stored in content database 130 (stored for example on a conventional computer (not shown)). The program content is periodically updated by one or more content service providers 132 and is deleted by content maintenance function 134 when no longer relevant (e.g., outdated news). The content from database 130 is broadcast on unused cellular channels (content channels) within the cell. Thus the number of available content channels changes as voice channel demand changes, and consequently the amount of content that is broadcast within the cell also dynamically changes. The dynamic nature of the content broadcast is described in detail below.

Cellular processor 106 outputs to input terminal 135 of voice channel demand monitor 136 the quantity of channels in use for communication between PSTN 110 and one or more transceivers 108 within the cell. In various embodiments, the quantity of channels in use can include downlink, uplink, or both downlink and uplink channels. Upon receiving the quantity of channels in use information, demand monitor 136 outputs to broadcast channel assignment system 138 the number $N_b$ of channels in use for conventional two-way communications within the cell.

In response to receiving $N_b$, broadcast channel assignment system 138 outputs to broadcast channel formatting system 140 and to content selection and prioritization system 142 the quantity of content channels that are available for content broadcast (i.e., the amount of content that can be currently broadcast). Content selection and prioritization system 142 then accesses and receives through data terminal 143 content from database 130, prioritizes the accessed content, and passes the prioritized content to formatting system 140. Priority is given, for example, to information of real-time importance such as motor vehicle traffic conditions. In turn, formatting system 140 formats the content for broadcast using the quantity of available content channels and then passes the channel-formatted content to channel assignment system 138. Assignment system 138 assigns the channel-formatted content to one or more specific unused cellular channels and outputs through output terminal 139 the channel-assigned content (illustrated as arrow C) to downlink combiner 126. Assignment system 138 also creates a transmission schedule (described in detail below) that is associated with the channel-assigned content and passes the transmission schedule (illustrated as arrow T) to combiner 26. Combiner 126 subsequently outputs the channel-assigned content (along with other conventional cellular downlink channels as described above) to downlink power amplifier 124 which, in turn, outputs the content and transmission on signal 144 to audio/video-on-demand receiver 146 (mobile unit). Monitor 136, assignment system 138, formatting system 140, and prioritization system 142 are implemented by one or more conventional computers (not shown) executing coded instructions (e.g., software) that can be routinely coded in light of this description.

Figure 3A:
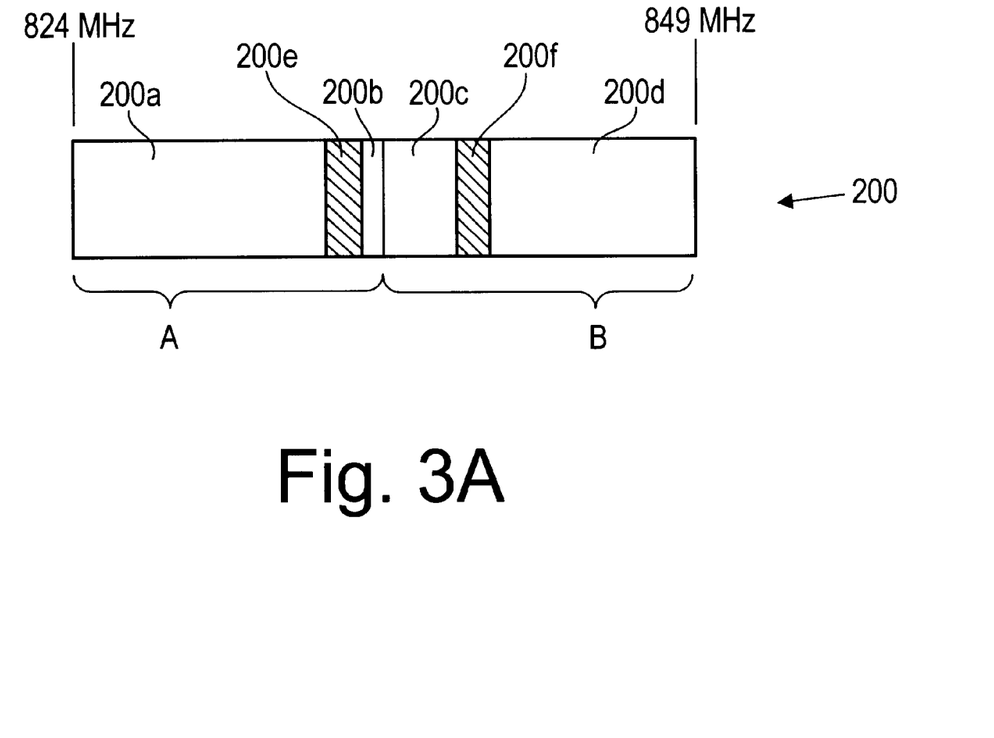
FIGS. 3A and 3B are illustrations of the U.S. analog cellular uplink frequency spectrum.
Figure 3B:
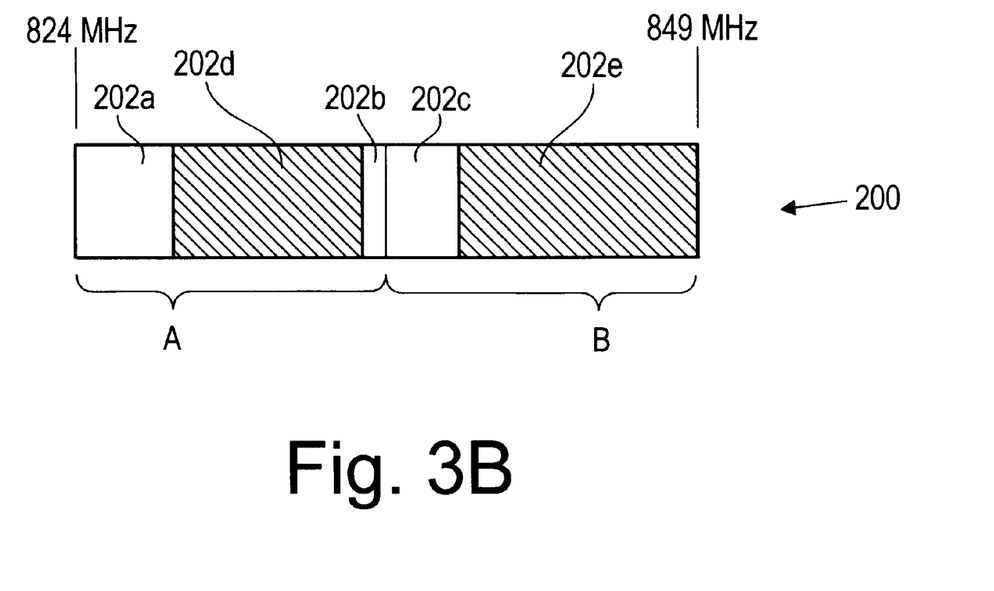

The audio/video-on-demand information (content, transmission schedule) can be broadcast on channels in both the cellular uplink and downlink spectra. FIGS. 3A and 3B are illustrations of the U.S. analog cellular uplink frequency spectrum 200, divided between commercial service providers A and B as shown. FIG. 3A illustrates the spectrum allocated according to an embodiment of the invention during a peak voice traffic channel demand time (e.g., 5:00 p.m. (1700)). Normal setup and voice traffic is carried on channels in portions 200a, 200b, 200c, and 200d. Content broadcast occurs in portions 200e and 200f, each of which have a relatively small bandwidth due to the large amount of voice traffic. FIG. 3B illustrates the spectrum allocated according to an embodiment of the invention during a non-peak voice traffic channel time (e.g., 3:00 a.m. (0300)). Normal setup and voice traffic is carried on channels in portions 202a, 202b, and 202c. Content broadcast occurs in portions 202d and 202e, each of which now have a relatively large bandwidth due to the small amount of voice traffic. Thus it is illustrated that the voice and content channel allocations dynamically change in response to user demand for voice channels. The frequency allocations depicted in FIGS. 3A and 3B are illustrative and many variations can be used. Similar channel allocation is used in embodiments that include TDMA and CDMA cellular systems, as well as those that use the U.S. personal communications system (PCS) system and foreign cellular systems.

To assist program capture, each program that is broadcast is associated with a unique identifier (e.g., identification number). A list of program identifiers is stored in the mobile unit, and the identifiers in the stored list correspond to the programs the user wishes to capture for later playback. The unique identifier is included with the program content that is broadcast on the content channels. A logic circuit (e.g., microprocessor/microcontroller and associated components) in the receiver identifies the program identifier, compares the received identifier with the stored list of identifiers, and determines if the broadcast program should be captured and stored.

In some embodiments the audio/video-on-demand receivers 146 scan the broadcast channels, identify content that is broadcast on the broadcast channels, and subsequently capture and store programs contained in the capture list. As described above, however, in other embodiments a content transmission schedule is broadcast to the audio/video-on-demand receivers. The transmission schedule can be broadcast on a channel that is dedicated to the schedule, or broadcast on a channel along with other content.

Figure 4:
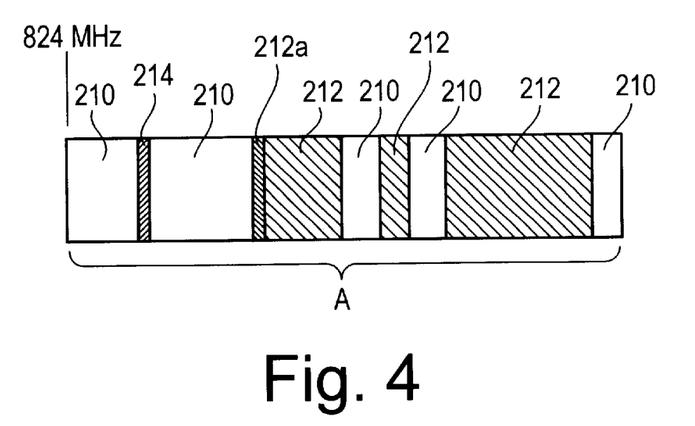
FIG. 4 is another illustration of a cellular uplink spectrum.

FIG. 4 is an illustration of a cellular uplink spectrum allocated to service provider A. In the illustrated spectrum, conventional cellular voice traffic occurs on channels in spectrum portions 210. Content broadcast occurs on content channels in spectrum portions 212. The content transmission schedule is broadcast on one content channel (transmission schedule channel) in spectrum portion 214 (multiple transmission schedule channels can be used in other embodiments).

The content transmission schedule is also assigned a unique identifier so that the audio/video-on-demand receiver can recognize the schedule. In some embodiments the transmission schedule identifies the content channel(s) on which certain programs are currently being broadcast. The transmission schedule information remains current for a time period (e.g., several minutes, one hour) sufficient to allow the mobile units to capture broadcast programs. Programs (and other information such as receiver operating parameter updates) are typically broadcast several times during a particular transmission schedule period to allow receivers that power-on during the schedule period to capture full programs. After a specific time, or in response to a dynamic change in voice channel demand (described below), the base station broadcasts a new transmission schedule and the programs listed in the new schedule. The transmission schedule can be adjusted to account for short-notice situations such as late receipt of an important bulletin to be broadcast to the mobile receivers, or for unexpected changes in demand for voice services.

TABLE I illustrates a transmission schedule at a high voice channel demand time (e.g., 1700) for a particular cell in which only channels 1 and 2 are used for broadcast in accordance with the invention (channels 3–56 remain dedicated to voice traffic use). TABLE II illustrates a transmission schedule at a low voice channel demand time (e.g., 0300) in which channels 1 through 45 are used for broadcast in accordance with the invention (channels 46–56 remain dedicated to voice traffic use).

TABLE I

| Channel | Frequency | Identifier |
|---------|-----------|------------|
| 1 | 827.060 | 10 |
| 2 | 827.090 | 127 |

TABLE II

| Channel | Frequency | Identifier |
|---------|-----------|------------|
| 1 | 827.060 | 10 |
| 2 | 827.090 | 127 |
| 3 | 833.470 | 500 |
| 4 | 833.500 | 38 |
| . | . | . |
| . | . | . |
| . | . | . |
| 45 | 848.180 | 67 |

In some embodiments the logic circuit in the mobile unit continuously monitors the transmission schedule and therefore quickly determines when a new transmission schedule is broadcast. In other embodiments the logic circuit places the mobile unit in a low power consumption ("sleep") mode to conserve battery life when no operation is required. In these sleep mode embodiments, the logic circuit periodically powers up ("wakes") the mobile unit and determines if a new transmission schedule is being broadcast. If so, then the logic circuit operates to capture any program that is listed on the stored capture list.

In other embodiments, the transmission schedule is expanded to allow two or more programs to be multiplexed on one channel. In these embodiments the transmission schedule includes the time that a specific program will be broadcast. TABLE III illustrates a transmission schedule for time multiplexed program broadcast.

TABLE III

| Channel | Frequency | (Time, Identifier) Pairs |
|---------|-----------|--------------------------|
| 1 | 827.060 | (3:15:23, 10), (3:19:05, 10), (3:31:47, 10) |
| 2 | 827.090 | (3:17:22, 7), (3:18:42, 82), (3:22:44, 75) |
| 3 | 833.470 | (3:06:35, 18), (3:08:52, 119), (3:30:02, 177) |
| 4 | 833.500 | (3:10:54, 352), (3:12:05, 77), (3:26:21, 24) |
| . | . | . |
| . | . | . |
| . | . | . |
| 45 | 848.180 | (3:29:11, 66), (3:19:05, 82), (3:31:47, 851) |

As illustrated in the TABLE III embodiment, the transmission schedule (identifier 10) is broadcast on channel 1 at 3:15:23, 3:19:05, and 3:31:47. On channel 2, program 7 is broadcast at 3:17:22, program 82 at 3:18:42, and program 75 at 3:22:44. Similar information is presented for channels 3 through 45. As for the single program per channel embodiments, in the multiplexed embodiment the transmission schedule information remains current for a set time period (e.g., one hour), after which the base station broadcasts a new transmission schedule and the new multiplexed programs according to the new schedule. In TABLEs I, II, and III the transmission schedule is associated with program identifier 10, but the channel assignments and program identifiers shown are illustrative.

An advantage of providing the time that a particular program will be broadcast is that the mobile receiver battery life can be extended. In some embodiments the logic circuit in the on-demand-receiver places the receiver in the sleep mode until the broadcast time nears for a particular broadcast program to be captured and stored. Just before the broadcast time, the logic unit wakes the receiver, tunes to the correct channel, and captures and stores the desired program.

Some embodiments in which specific broadcast times are given are modified to accommodate short-notice changes such as emergency bulletin broadcasts. In one embodiment, a specific broadcast content channel (e.g., 212a in FIG. 4), or a particular time slot in a content channel, is reserved for emergency bulletin use. Such a bulletin is continuously broadcast on the dedicated channel, and the mobile receiver is configured so that the bulletin is captured when the mobile wakes up to capture a program on the capture list.

As mentioned above, the system dynamically accommodates the changing voice channel demand within cells. First, the maximum number of channels that are available for content broadcast within each particular cell is varied by time of day and/or day of week. For example, a small fraction of voice channels are made available as broadcast channels during peak voice transmission demand times, whereas a large fraction of voice channels are made available as broadcast channels during slack voice transmission demand times. Such day/hour voice channel allocation is made, for example, on historic calling patterns within particular cells or groups of cells. The historic calling patterns can be periodically updated. Second, broadcast channels are returned to voice channel status to ensure that the commercial cellular carrier's voice transmission service remains available to the maximum extent possible. When the voice transmission demand lessens, the designated channels are once again used as broadcast channels.

TABLE IV illustrates one embodiment of a demand-based dynamic change in broadcast channel allocation, depicting a time window surrounding the dynamic change. As shown in TABLE IV, channels 01, 02, and 03 have been made available as broadcast channels. Each broadcast channel is divided into transmission slots (T1–T9 are illustrated) during which all or a portion of a particular content program is broadcast. For instance, portions of programs 7 and 82 are broadcast in alternating slots T1 to T4 on channel 01. Similarly, portions of programs 75 and 18 are broadcast in alternating slots on channel 02, and portions programs 119, 177, and 352 are broadcast in alternating slots in channel 03. The mobile unit stores the program portions for subsequent reassembly into a complete program for later output to the user. This illustrative broadcast scheme continues until voice transmission demand exceeds the available voice channel capacity at which time a broadcast channel (e.g., channel 02) is made available to carry voice traffic.

TABLE IV

| Channel | Transmission Slot | | | | | | | | |
|---|---|---|---|---|---|---|---|---|---|
| | T1 | T2 | T3 | T4 | T5 | T6 | T7 | T8 | T9 ... |
| CH 01 | 7 | 82 | 7 | 82 | S-2 | 7 | 82 | 75 | 7 ... |
| CH 02 | 75 | 18 | 75 | 18 | S-2 | V | V | V | V ... |
| CH 03 | 119 | 177 | 352 | 119 | S-2 | 177 | 352 | 18 | 119 ... |
| . | . | . | . | . | . | . | . | . | . |
| . | . | . | . | . | . | . | . | . | . |
| . | . | . | . | . | . | . | . | . | . |
| CH S | S-1 | S-1 | S-1 | S-1 | S-2 | S-2 | S-2 | S-2 | S-2 ... |

Referring to both TABLE IV and FIG. 2, for instance, cellular processor 106 receives from transceiver 108 or PSTN 110 a request for a voice channel during slot T4 but none are available. Therefore, cellular processor 106 outputs to demand monitor 136 a demand for an additional voice channel. In response, demand monitor 136 outputs updated $N_b$ to assignment system 138 and formatting system 140. Assignment system 138 determines which of the broadcast channels will be returned to voice channel status (channel 02 in this illustration) and, along with formatting system 140, outputs to downlink combiner 126 a message S-2 for transmission on all broadcast channels. Message S-2 notifies all mobile receivers 146 that a change to the broadcast channel allocation is about to be made. Message S-2 also describes the nature of the modification (i.e., new transmission schedule). Following the broadcast of message S-2, assignment system 138 makes channel 02 available for the new voice traffic (shown as a "V" in the subsequent transmission slots).

In some embodiments the broadcast of the programs assigned to the channel that is returned to voice channel status is terminated until that channel returns to broadcast channel status. But TABLE IV illustrates embodiments in which the preempted programs are reassigned to other broadcast channels. As shown, program 75 is reassigned to channel 01 and is multiplexed with programs 7 and 82. Similarly, program 18 is reassigned to channel 03 and is multiplexed with programs 119, 177, and 352. The depicted reassignment scheme is illustrative and many variations are possible. The program content broadcast data rate decreases because there are fewer available broadcast channels. Therefore, embodiments of channel formatting system 140 ensure that once broadcast of a particular broadcast begins, the broadcast will continue until the entire program has been transmitted to receivers 146. Accordingly, the first portions of a particular program may be broadcast on channel 02 and the remaining portions on channel 01.

In some embodiments assignment system 138 selects the broadcast channel used for the voice traffic in a round-robin manner. In other embodiments assignment system 138 selects the broadcast channel based on other factors such as the priority of the programs broadcast on a particular channel. If emergency news bulletins are being broadcast on a particular channel, for example, that channel will be the last broadcast channel selected to handle the voice channel demand overflow.

In addition, in some embodiments formatting system 140 allocates transmission slots to selected programs in a round-robin manner, while in other embodiments one or more particular programs can be designated for priority transmission. Persons skilled in the art can readily implement a variety of channel-sharing algorithms which accommodate factors such as broadcast program order, duration, and priority.

Message S-2 can be periodically broadcast (e.g., every five minutes) on all channels to ensure that the on-demand-receivers frequently receive the latest schedule. TABLE IV also illustrates optional channel S on which transmission schedules are broadcast. As shown, message S-1 includes the transmission schedule before cellular processor 106 receives the voice request during slot T4 (i.e., programs 7 and 82 are broadcast on channel 01, programs 75 and 18 on channel 02, programs 119, 177, and 352 on channel 03, etc.). Message S-2 is broadcast on channel S after the broadcast channel reallocation is complete and includes the new transmission schedule. Receivers 146 monitor channel S and can therefore quickly determine the correct channel on which a selected program can be captured.

Once increased voice traffic demand ends, the preempted channel is returned to broadcast channel status in way that is generally the reverse of the procedures described above. TABLE V illustrates an embodiment of a dynamic reallocation of a channel back to broadcast channel status. As shown, channel 02 which was designated as being available for broadcast channel status is carrying voice traffic "V" in slots T1–T5. Channels 01 and 03 are carrying program content. When the voice traffic ends during slot T5, cellular processor 106 outputs to demand monitor 136 that channel 02 is no longer required for voice traffic. As a result, assignment system 138 and formatting system 140 reallocate programs among the increased number of broadcast channels now available and output a new message S-3 that alerts receivers 146 of the broadcast change and, in some embodiments, includes a new transmission schedule. In some embodiments formatting system 140 allocates programs based on priority schemes such as those described above. Optional channel S continuously broadcasts the transmission schedules in some embodiments.

TABLE V

| Channel | Transmission Slot | | | | | | | | |
|---|---|---|---|---|---|---|---|---|---|
| | T1 | T2 | T3 | T4 | T5 | T6 | T7 | T8 | T9 ... |
| CH 01 | 7 | 82 | 75 | 7 | 82 | S-3 | 7 | 82 | 7 ... |
| CH 02 | V | V | V | V | V | S-3 | 75 | 18 | 75 ... |
| CH 03 | 177 | 352 | 18 | 119 | 177 | S-3 | 352 | 119 | 177 ... |
| . | | | | | | | | | |
| . | | | | | | | | | |
| CH S | S-2 | S-2 | S-2 | S-2 | S-2 | S-3 | S-3 | S-3 | S-3 ... |

Program capture by a mobile receiver is characterized by three situations when the receiver moves from one cell to an adjacent cell. First, a program to be captured that is broadcast in the first cell is not being broadcast in the adjacent cell. Second, the program to be captured is broadcast in both cells. Third, the program to be captured is not broadcast in the first cell, but is being broadcast in the adjacent cell. Without information about the programs being broadcast in adjacent cells, the receiver must reacquire a transmission schedule (if available) or determine the programs that are being broadcast in the new cell as the receiver moves into the new cell. The delay can result in the receiver's failure to capture portions of desired programs.

In some embodiments each cell broadcasts transmission schedules for adjacent cells in addition to its own transmission schedule. Cells typically have a unique identifier (e.g., numeric designator, or numeric designator plus a "digital color code" value). Thus when in one cell, the mobile receiver captures and stores transmission schedules for adjacent cells, and when the mobile receiver determines that it has entered one of the adjacent cells it uses the stored transmission schedule to quickly tune and capture programs (and new adjacent cell transmission schedules) in the new cell. In an illustrative k=7 cellular tiling pattern (FIG. 1), formatting system 140 and assignment system 138 provide transmission schedules for seven total cells to one cell's base station. Referring to FIG. 1, the base station in cell 4 transmits schedules for cells 1, 2, 3, 5, 6, and 7 in addition to the schedule for cell 4.

Details of content program capture and reassembly are given in U.S. patent application Ser. No. 09/630,053, entitled "Broadcast Program Capture and Playback Enhancement Signal Structure, Receiver, and Method" by Edward J. Costello, Albert W. Wegener, Thomas W. Linden, and Serge Swerdlow that is filed concurrently and is incorporated by reference.

Figure 5:
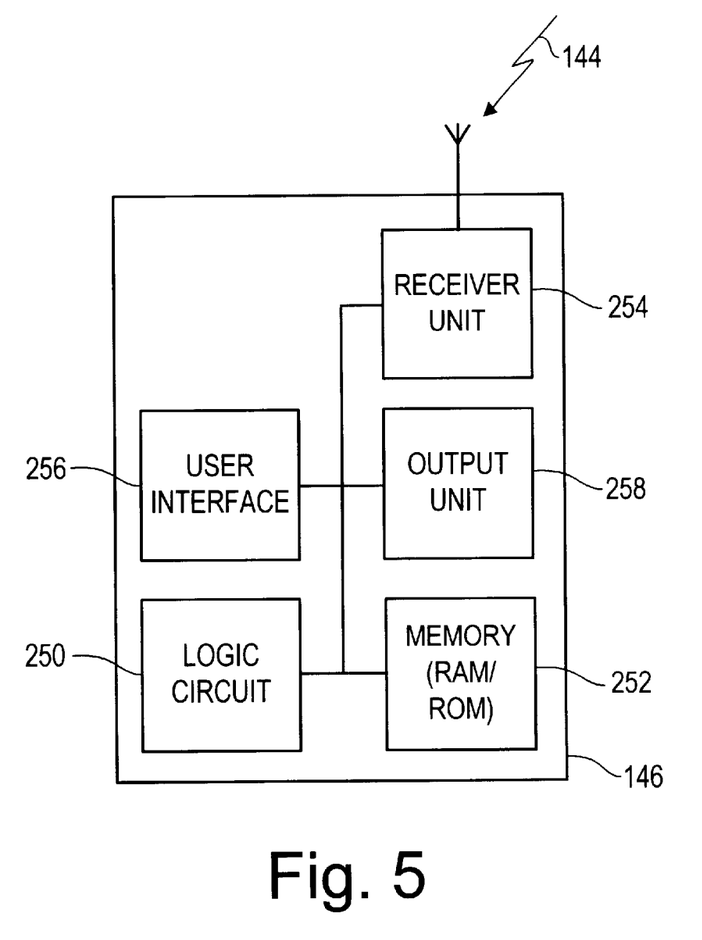
FIG. 5 is a diagrammatic view of an audio/video-on-demand receiver.

FIG. 5 is a diagrammatic view of an illustrative audio/video-on-demand receiver 146. Logic circuit 250 controls receiver 146 operation as described herein and includes a conventional microprocessor/microcontroller that executes coded instructions (e.g., software, firmware) stored in memory 252. Memory 252 includes both random access and read only memories. Receiver unit 254 receives signal 144 and captures program content and transmission schedule information. Receiver unit 254 can also capture other information from signal 144 such as new receiver 146 operating parameters. Captured information is stored in memory 252. In response to a user input on user interface 256, logic circuit 250 accesses one or more stored programs in memory 252 and outputs the accessed programs using output unit 258. Logic circuit 250 also accesses stored transmission schedule information in memory 252 so as to tune receiver unit 254 to the proper channel (at the proper time in some embodiments) for program content reception.

Figure 6A:
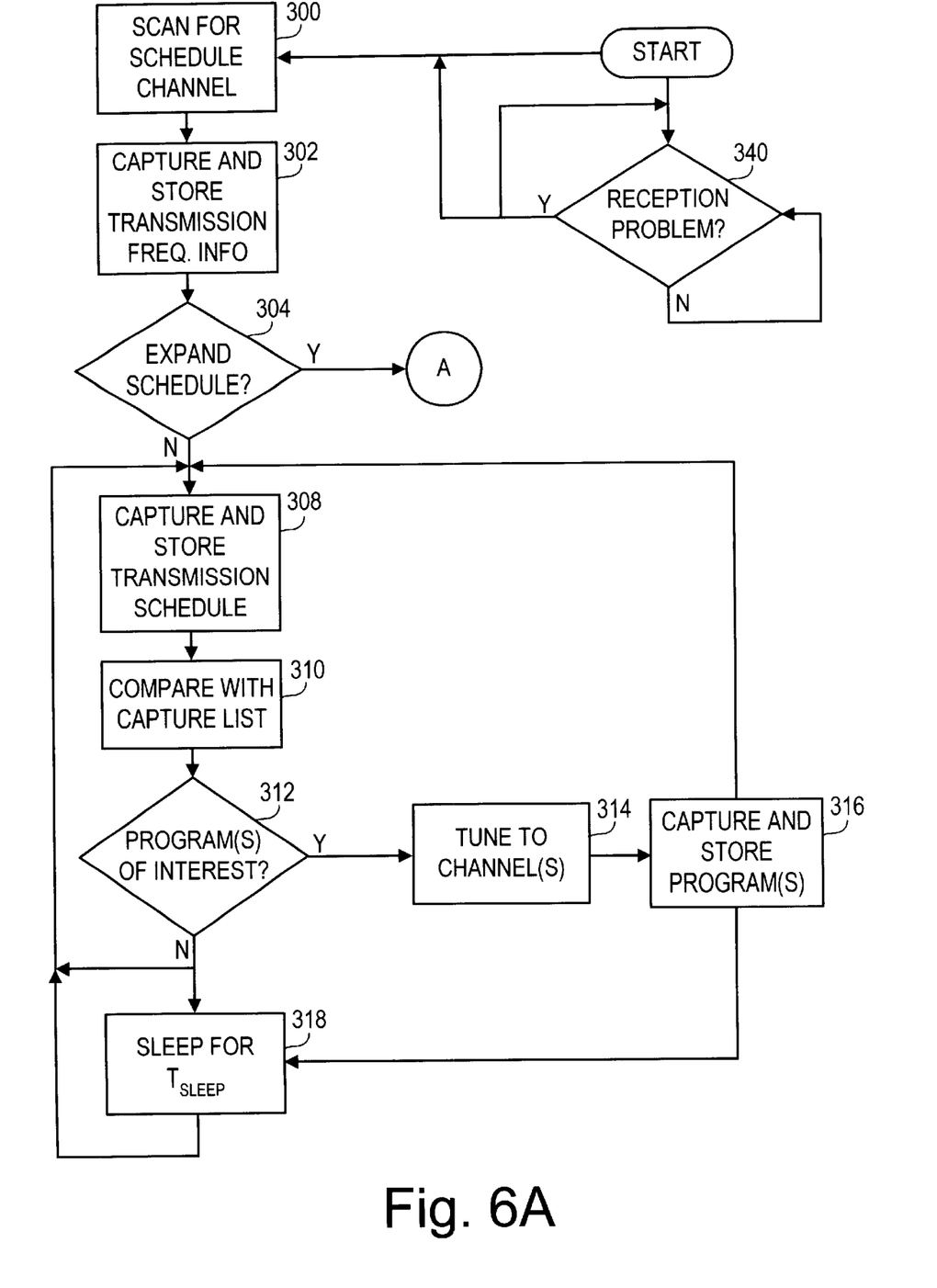
FIGS. 6A and 6B are flow diagrams illustrating actions performed by a logic circuit.
Figure 6B:
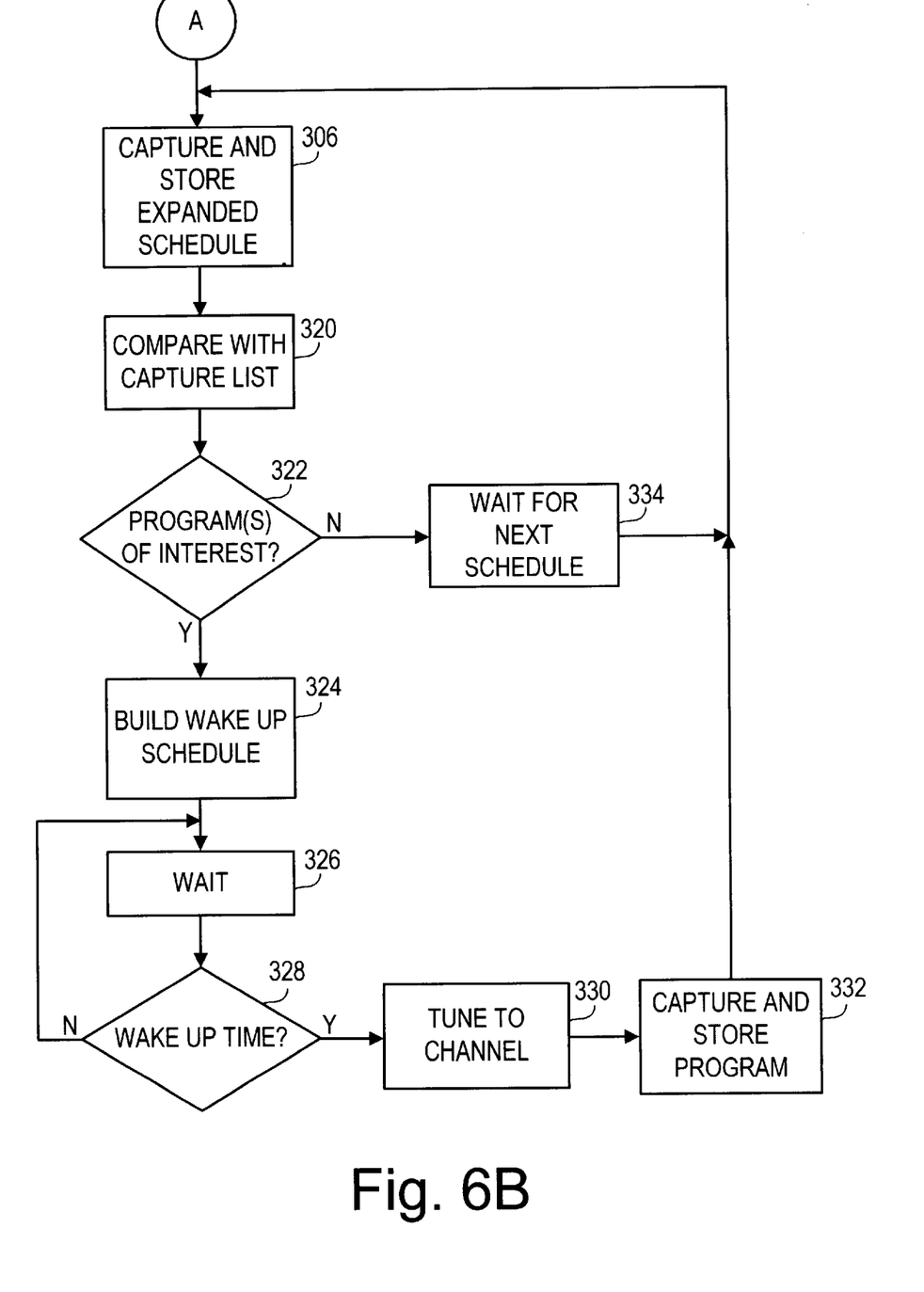

FIGS. 6A and 6B are flow diagrams illustrating actions performed by the logic circuit in the mobile unit as the logic circuit executes coded instructions stored in memory. The instructions are easily coded by a skilled programmer in view of this disclosure. After the mobile receiver is powered on, in 300 the logic circuit scans the cellular channels (e.g., 1–833 in the U.S. analog spectrum) for the audio/video-on-demand transmission schedule channel associated with the cellular service provider. The transmission schedule channel can be a setup, paging, or traffic channel, and can be uniquely identified in a manner similar to the identification for existing cellular system setup channels (e.g., unique frequency, unique modulating pattern or synchronization (sync) word, or repeated data pattern transmitted on the channel).

Once the logic circuit identifies the audio/video-on-demand transmission schedule channel, in 302 the logic circuit acts to capture and store information identifying the content transmission channels associated with the cellular service provider. In 304 the logic circuit determines if the cellular service provider is using the expanded transmission schedule that includes broadcast times. If so, the logic unit continues to 306 (FIG. 6B).

If the service provider is not using an expanded transmission schedule, the mobile unit's logic circuit acts in 308 to capture and store the transmission schedule information. Then, in 310 the logic circuit compares the program identifiers in the transmission schedule with the program identifiers stored in the mobile unit's capture list. If one or more transmission schedule and capture list program identifiers match in 312, the logic circuit tunes in 314 to the appropriate channel(s) and in 316 captures and stores the program(s) in the memory of the mobile unit for subsequent output to the user.

In some embodiments the logic circuit acts to place the mobile unit in an optional sleep mode. If no programs of interest exist in 312, for example, the mobile unit enters into a sleep mode in 318 for a period of time $T_{SLEEP}$ until the mobile unit awakes to capture and store a new transmission schedule in 308. Alternatively, or in addition, in some embodiments the mobile unit enters into the sleep mode in 318 after capturing and storing all programs of interest in 316.

Referring to FIG. 6B, in 306 the mobile unit logic circuit acts to capture and store the expanded transmission schedule. In 320 the logic circuit compares the program identifiers in the transmission schedule with the program identifiers stored in the mobile unit's capture list. If one or more transmission schedule and capture list program identifiers match in 322, the logic circuit builds in 324 a wakeup schedule in the mobile unit memory using the times in the expanded transmission schedule. Then, in 326 and 328 the logic circuit waits until just prior to the broadcast time for the one or more programs of interest identified in 322. At the correct time, the logic unit acts to power up the mobile unit, tune in 330 to the broadcast channel for the program of interest, and in 332 capture and store the program of interest. The diagram in FIG. 6B is simplified for clarity, and the process loops back if one or more additional programs are to be captured using the information from the last-received transmission schedule. If no programs of interest are identified in 322, the logic circuit moves to 334 and waits (e.g., in the sleep mode) for a predetermined time (e.g., 2 hours) to capture the next expanded schedule in 306 again.

Referring again to FIG. 6A, in 340 the logic circuit also continuously monitors for broadcast signal reception problems. When a reception problem is detected, the logic circuit returns to 300 and again scans for a usable transmission schedule channel.

The invention has been described in terms of specific embodiments. Persons skilled in communications will appreciate, however, that many variations are possible. The scope of the invention is therefore not limited to the embodiments described herein, but instead is limited only by the following claims.

I claim:

1. A broadcasting method comprising the acts of:

identifying a quantity of unused channels in a particular cell of a cellular wireless communications system;

accessing program content from a content database based on the quantity of unused channels;

formatting the accessed program content for broadcast on at least one of the unused channels;

broadcasting the formatted content on at least one of the unused channels;

associating a transmission schedule with program content that is broadcast in a second cell adjacent to the particular cell; and broadcasting the transmission schedule in the particular cell.

2. The method of claim 1 wherein the transmission schedule includes the channel over which a particular program is broadcast.

3. The method of claim 1 wherein the transmission schedule includes a time at which a particular program is broadcast.

4. The method of claim 1 further comprising the acts of:

reserving at least one of the unused channels for short-notice content; and broadcasting short-notice content on the reserved channel.

5. The method of claim 1 further comprising the acts of:

detecting an increase in voice traffic demand within the particular cell;

terminating broadcasting of the content on one of the identified unused channels; and subsequently using the one of the unused channels to carry voice traffic.

6. The method of claim 5 further comprising the acts of:

identifying certain program content that will not be broadcast on the one of the identified unused channels due to the act of terminating content broadcast; and broadcasting the certain program content on another of the identified unused channels subsequent to using the one of the unused channels to carry voice traffic.

7. A method for receiving an audio or video program in a mobile receiver, comprising the acts of:

receiving via a channel in a first cell of a wireless cellular communications system a first transmission schedule and a second transmission schedule, wherein the first transmission schedule identifies a channel on which the program is broadcast in the first cell, and the second transmission schedule identifies a channel on which the program is broadcast in a second cell of the wireless cellular communications system, the second cell being adjacent the first cell;

storing the received first and second transmission schedules in the receiver;

using the first transmission schedule to capture a first portion of the program if the receiver is located in the first cell;

using the second transmission schedule to capture a second portion of the program if the receiver is located in the second cell subsequent to being in the first cell; and storing the captured first and second portions of the program in the receiver for output on demand by a user.

8. A broadcasting method comprising the acts of:

identifying a quantity of unused channels in a particular cell of a cellular wireless communications system;

accessing program content from a content database based on the quantity of unused channels;

formatting the accessed program content for broadcast on at least one of the unused channels;

broadcasting the formatted content on at least one of the unused channels;

associating a transmission schedule with the accessed program content;

broadcasting the transmission schedule on at least one of the unused channels; and simultaneously broadcasting on each unused channel a message indicating that the transmission schedule is replaced by a second transmission schedule.

9. The method of claim 8 wherein the transmission schedule includes the channel over which a particular program is broadcast.

10. The method of claim 8 wherein the transmission schedule includes a time at which a particular program is broadcast.

11. The method of claim 8 further comprising the acts of:

reserving at least one of the unused channels for short-notice content; and broadcasting short-notice content on the reserved channel.

12. The method of claim 8 further comprising the acts of:

detecting an increase in voice traffic demand within the particular cell;

terminating broadcasting of the content on one of the identified unused channels; and subsequently using the one of the unused channels to carry voice traffic.

13. The method of claim 12 further comprising the acts of:

identifying certain program content that will not be broadcast on the one of the identified unused channels due to the act of terminating content broadcast; and broadcasting the certain program content on another of the identified unused channels subsequent to using the one of the unused channels to carry voice traffic.

* * * * *